(12) United States Patent
Gliesman et al.

(10) Patent No.: US 11,625,924 B2
(45) Date of Patent: Apr. 11, 2023

(54) VEHICLE PARKING MONITORING SYSTEMS AND METHODS

(71) Applicant: Ford Global Technologies, LLC, Dearborn, MI (US)

(72) Inventors: Andrew Gliesman, Dearborn, MI (US); Megan Worrel, Troy, MI (US); David Kramer, Clarkston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 17/008,533

(22) Filed: Aug. 31, 2020

(65) Prior Publication Data

US 2022/0067392 A1    Mar. 3, 2022

(51) Int. Cl.
| | |
|---|---|
| *G06V 20/54* | (2022.01) |
| *G06T 7/11* | (2017.01) |
| *G06T 7/246* | (2017.01) |
| *G08G 1/017* | (2006.01) |
| *G08G 1/14* | (2006.01) |
| *G08G 1/04* | (2006.01) |
| *H04N 23/68* | (2023.01) |

(52) U.S. Cl.
CPC .............. *G06V 20/54* (2022.01); *G06T 7/11* (2017.01); *G06T 7/248* (2017.01); *G08G 1/017* (2013.01); *G08G 1/04* (2013.01); *G08G 1/146* (2013.01); *H04N 23/682* (2023.01); *G06T 2210/12* (2013.01); *G06V 2201/08* (2022.01)

(58) Field of Classification Search
CPC ...... G06V 20/54; G06V 2201/08; G06T 7/11; G06T 7/248; G06T 2210/12; G08G 1/017; G08G 1/04; G08G 1/146; H04N 5/23264; H04N 23/682
See application file for complete search history.

(56) References Cited

U.S. PATENT DOCUMENTS

| | | |
|---|---|---|
| RE38,626 E | 10/2004 | Kielland |
| 7,825,826 B2 | 11/2010 | Welch |
| 10,093,223 B2 | 10/2018 | Pal et al. |
| 2011/0099126 A1 | 4/2011 | Belani et al. |
| 2015/0222859 A1* | 8/2015 | Schweid ............... G06V 20/00 348/148 |
| 2018/0268563 A1* | 9/2018 | Chen ...................... G06T 7/70 |
| 2019/0191093 A1* | 6/2019 | Wada ............... H04N 5/23258 |
| 2019/0208168 A1* | 7/2019 | Collings, III ......... H04N 7/188 |

(Continued)

OTHER PUBLICATIONS

R.E. Barone et al. "Architecture for Parking Management in Smart Cities" IET Intell. Transp. Syst. vol. 8 Iss. 5 (Dec. 2014) pp. 445-452.

*Primary Examiner* — Kenny A Cese
(74) *Attorney, Agent, or Firm* — Brandon Hicks; Eversheds Sutherland (US) LLP

(57) ABSTRACT

Vehicle parking monitoring systems and methods are disclosed herein. An example method can include receiving images from a camera of a parking spot, each of the images being time stamped, determining presence of a vehicle in the images, placing a bounding area around a region of interest of the vehicle, the region of interest including no personally identifiable information, retaining the bounding area and discarding a remainder of the images, and determining when the vehicle is no longer present based on a change in the bounding area of the images.

11 Claims, 6 Drawing Sheets

(56) References Cited

U.S. PATENT DOCUMENTS

| | | | |
|---|---|---|---|
| 2019/0294889 A1* | 9/2019 | Sriram | G06V 10/82 |
| 2020/0116983 A1* | 4/2020 | Tomioka | G02B 15/1461 |
| 2021/0056847 A1* | 2/2021 | Saxena | G06V 10/22 |

* cited by examiner

VEHICLE PARKING MONITORING SYSTEMS AND METHODS

BACKGROUND

Optical sensors, such as safety and security surveillance cameras, have proven to be a low cost way of identifying vehicles in parking lots and individual parking spots in real time. The need to know how long a vehicle has remained in a parking spot over time is also desired when it comes to imposing time limits in parking areas, electrical vehicle charging areas, or other special usage parking spots. This can be achieved by observing video images over time. Doing so, however, can involve the potential acquisition of personal identifiable information.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure generally pertains to systems and methods for monitoring vehicle parking areas in such a way that no personally identifiable information (PII) is collected or processed while retaining the ability to enforce parking limits. These systems and methods protect PII when identifying and tracking vehicles in parking lot environments (e.g., identifying when vehicles are present past a threshold amount of time). A camera platform can be configured to detect a vehicle and capture images of the vehicle over time. The camera platform can redact a portion of each image using a bounding area. Pixels within the bounding area can be captured and data other than the pixel data, relative coordinates, and time stamp information can be discarded. Time stamp information can be used to determine when comparing temporally adjacent frames that are indicative of motion in a region of interest, such as vehicle motion. Statistical methods can be used to determine confidence levels of state changes. If no change is detected after expiration of a threshold parking limit, an alert can be transmitted to a service provider such as an enforcement entity. In sum, the systems and methods disclosed herein may utilize optical sensors (such as video cameras or the like) to detect the presence of vehicles in parking spaces. The systems and methods can determine when the vehicles have been parked longer than allowable using only a minimal amount of required data in order to protect against PII intrusion and prevent data compromise.

Illustrative Embodiments

Figure 1:
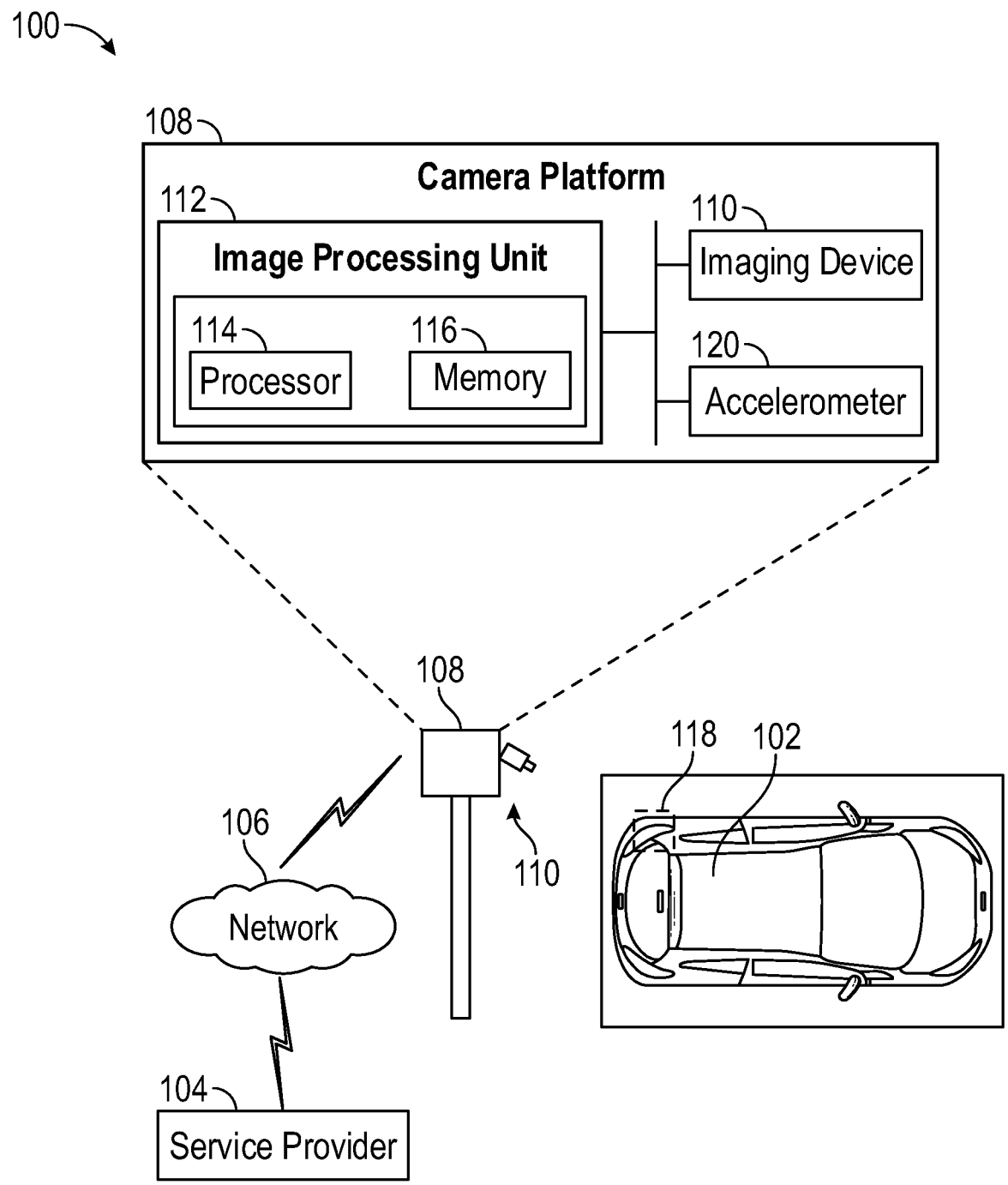
FIG. 1 depicts an illustrative architecture in which techniques and structures for providing the systems and methods disclosed herein may be implemented.
Figure 1:
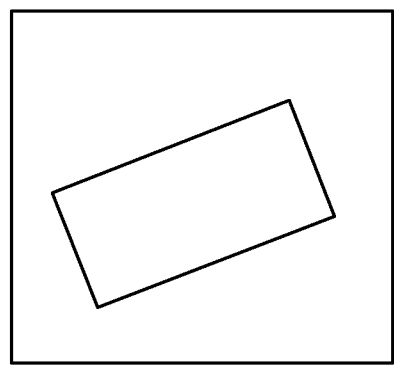
Figure 1:
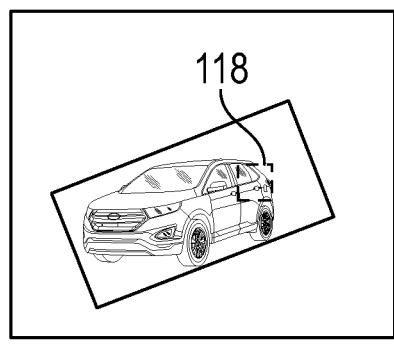
Figure 1:
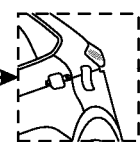
Figure 1:
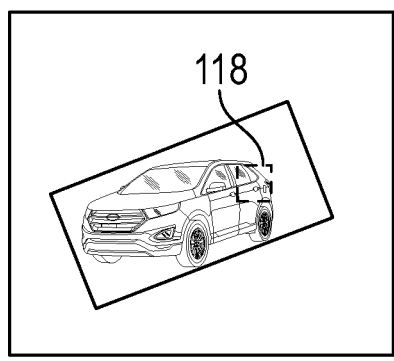
Figure 1:
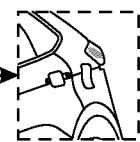

Turning now to the drawings, FIG. 1 depicts an illustrative architecture 100 in which techniques and structures of the present disclosure may be implemented. The architecture 100 can include a vehicle 102, a service provider 104, and a network 106. The network 106 may include any one or a combination of multiple different types of networks, such as cable networks, the Internet, cellular networks, wireless networks, and other private and/or public networks. In some instances, the network 106 may include cellular, Wi-Fi, or Wi-Fi direct. In other embodiments, components of the environment can communicate using short-range wireless protocols such as Bluetooth, near-field, infrared, and the like. Any suitable network may be used herein.

The service provider 104 can be configured to communicatively couple with one or more imaging devices included in a camera platform 108. The camera platform 108 can comprise an imaging device 110 and an image processing unit 112. The image processing unit 112 can comprise a processor 114 and memory 116. The memory 116 may be configured to store instructions that can be executed by the processor 114 to perform any of the image processing and alerting methods disclosed herein. The image processing unit 112 can be configured to communicate over the network 106 with any of the components of the architecture, such as the service provider 104. The image processing unit 112 can incorporate or use any known communication device to transmit and/or receive data over the network 106. When referencing operations performed by the image processing unit 112, it will be understood that this includes the execution of instructions stored in the memory 116 by the processor 114. The camera platform 108 can be configured to block incoming network connections and data for security purposes. That is, the camera platform 108 can be configured to only transmit data.

The image processing unit 112 can be configured to obtain images of a parking spot 110 or other area of interest where a vehicle may be parked. For example, the imaging device 114 can obtain a series of images over time of the parking spot 110. In one example, three images 116A, 116B, and 116C may be obtained of the parking spot 110. The image processing unit 112 can process the images 116A, 116B, and 116C to detect a vehicle present in the parking spot 110. For example, the vehicle 102 is not present in image 116A, but is present in image 116B, and is also present in image 116C. The images can be obtained according to a schedule, such as every second, minute, or hour. In some instances, taking images every minute may not be sufficient—consider the edge case where car A pulls out of the parking spot and car B, which is the same make/model as car A, pulls in a short period later. If this process occurs in less than one minute, the program may not detect a substantial change in the frame and may keep the timer running, potentially falsely identifying car B as exceeding the time limit. Thus, shorter schedules may be needed. The specific schedule and time frames can be selected as desired. In some instances, the images are obtained on a continual or real-time basis.

When the image processing unit 112 detects the vehicle 102 in image 116B, the image processing unit 112 can begin a counter (timer). For example, a vehicle may be allowed to park in the parking spot 110 for a predetermined amount of time (e.g., allotted time period). The vehicle is subject to a fine or penalty if parked for more than the predetermined amount of time. The image processing unit 112 can use the counter to determine whether the vehicle 102 has been parked in excess of the allotted time period.

When the vehicle 102 is detected in the parking spot 110, the image processing unit 112 can begin to track a specific bounding area 118 of the image 116B. For example, a section of a rear-left quarter panel of the vehicle 102 can be included in the bounding area 118.

The remainder of the image 116B can be discarded to ensure that no PII is retained or processed. That is, the image processing unit 112 can redact only the pixel data included in the bounding area 118. The remainder of the image can be discarded. In some instances, a relative position of the bounding area 118 on the image is determined so that the bounding area 118 can be projected onto other images by the image processing unit 112.

For subsequent images, the image processing unit 112 can obtain only parts of the image that correspond to the same bounding area 118. Thus, the bounding area 118 of image 116C can be evaluated by the image processing unit 112. The image processing unit 112 can use a comparative process to determine if the vehicle 102 is present or not based on changes between the bounding area 118 obtained from image 116B compared with the bounding area 118 obtained from image 116C. Thus, the image processing unit 112 can compare bounding areas between temporally adjacent images to determine when vehicle movement has occurred or has not occurred.

In this example, the remainder of the images 116B and 116C are discarded except for the boundary areas. Image 116A can be discarded entirely, if desired. Retained portions 119A and 119B can be compared to one another by the image processing unit 112 to determine when the vehicle does or does not move. As illustrated, a comparison between retained portions 119A and 119B would indicate no change in vehicle position. If retained portion 119B is associated with an image that has a time stamp that exceeds an allotted parking time limit, the vehicle may be considered to be over parked. As noted above, image 116B may be the first image where the image processing unit 112 detects presence of the vehicle 102. Thus, a counter may be started once the image 116B has been processed and vehicle presence determined. To be sure, this can include a comparison with the image 116A where the vehicle is not present.

When the image processing unit 112 does not detect the vehicle 102 based on bounding area analysis, the image processing unit 112 can transmit a signal to the service provider 104 that the parking spot 110 is unoccupied. When the image processing unit 112 detects that the vehicle 102 has been in the parking spot 110 longer than the predetermined amount of time, the image processing unit 112 can transmit a signal to the service provider 104 that the vehicle 102 has overstayed the allotted time period.

In some instances, the image processing unit 112 can apply one or more types of statistical analyses to determine a confidence level related to state changes. For example, the vehicle detection algorithm returns a confidence level when it determines it has identified a vehicle. Different vehicles, lighting, and weather conditions will lead to different levels of confidence in the vehicle detection. Analyzing the bounding box's coordinates over time, weighted with the confidence of the vehicle detection algorithm, individual parking spots can develop a confidence level to them. (This is ignoring the paint on the ground, it is just watching the frames and sees that, every day, a vehicle parks in a specific location. Over time those locations become learned and can improve the confidence of the overall system and alert administrators of new parking abnormalities.)

For example, the image processing unit 112 to determine a confidence level when a parking spot 110 is determined to be occupied after the parking spot 110 has been determined to be unoccupied, and vice-versa. A confidence level related to vehicle movement can also be calculated.

The camera platform 108 can comprise an accelerometer 120. Movement of the camera platform 108 can be determined from output of the accelerometer 120. The image processing unit 112 can compensate for movement of the camera platform 108 using accelerometer output. For example, the image processing unit 112 can shift the bounding area 118 to correspond to the measured movement of the camera platform 108 to ensure that subsequent images include boundary areas that substantially correspond to the boundary area of image prior to movement of the camera platform 108. The output of the accelerometer 120 can also be used to determine when a tampering event may have occurred, such as an impact or a reorienting of the camera platform 108.

Another error correction feature can include compensating for events that may compromise the quality of the images. For example, the image processing unit 112 can be configured to detect ambient weather such as rain, lightning, snow, as well as other obstructions in an image. The image processing unit 112 can compensate for these ambient weather conditions by adjusting one or more parameters of the image such as brightness, saturation, and so forth. Information regarding the ambient weather conditions could be determined from the service provider 104.

Figure 2A:
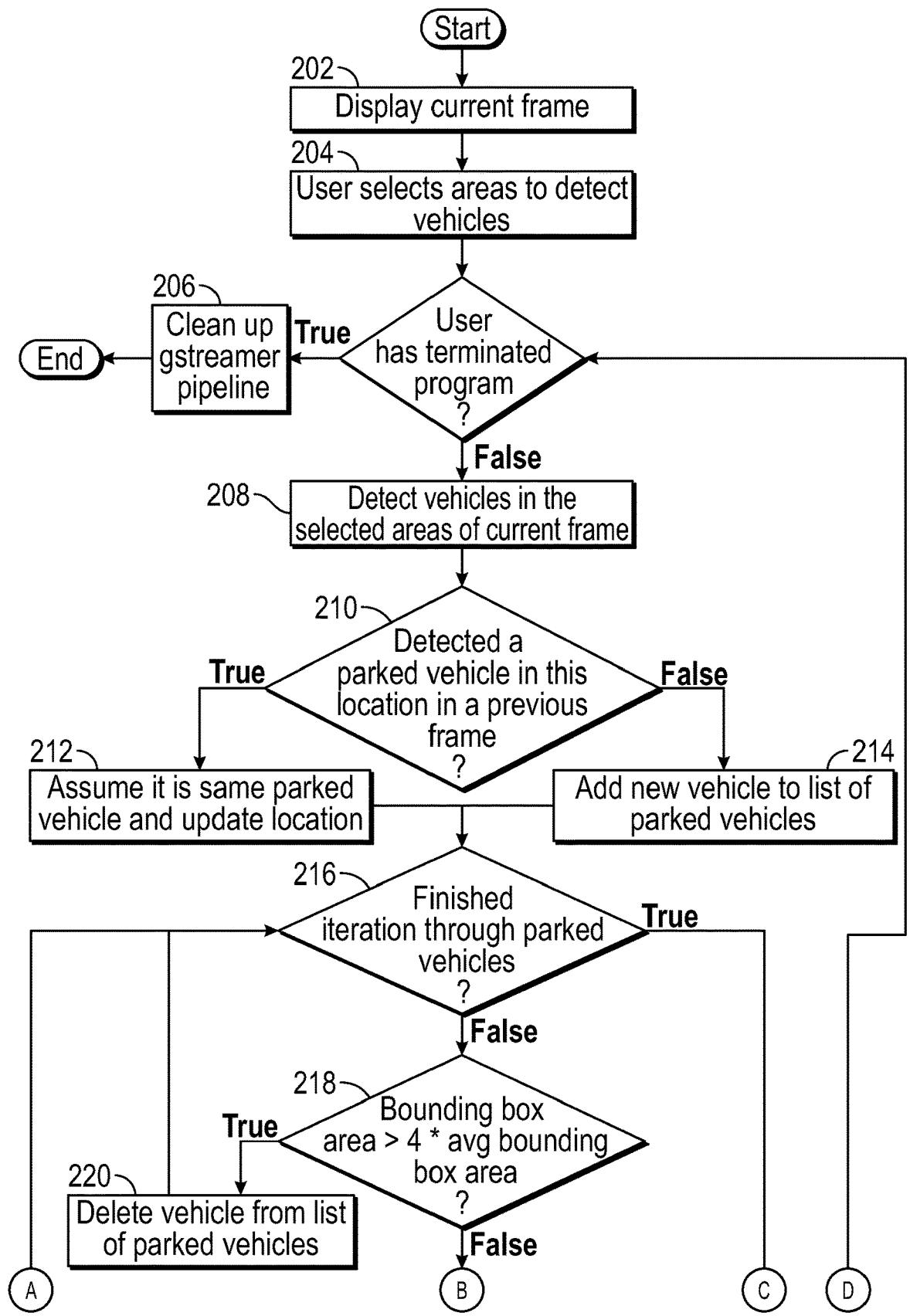
FIGS. 2A to 2C is a flowchart of an example method of the present disclosure.
Figure 2B:
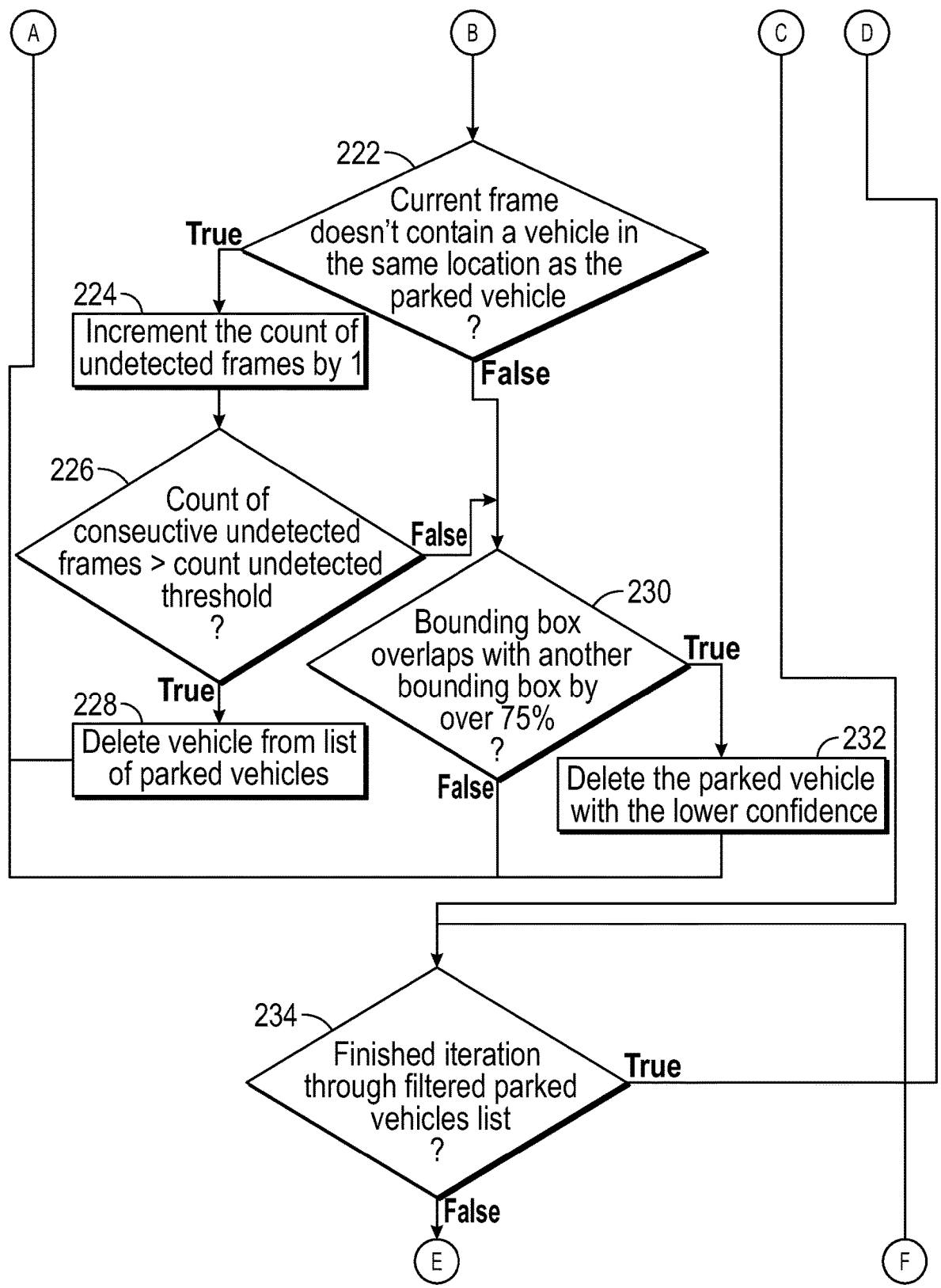
Figure 2C:
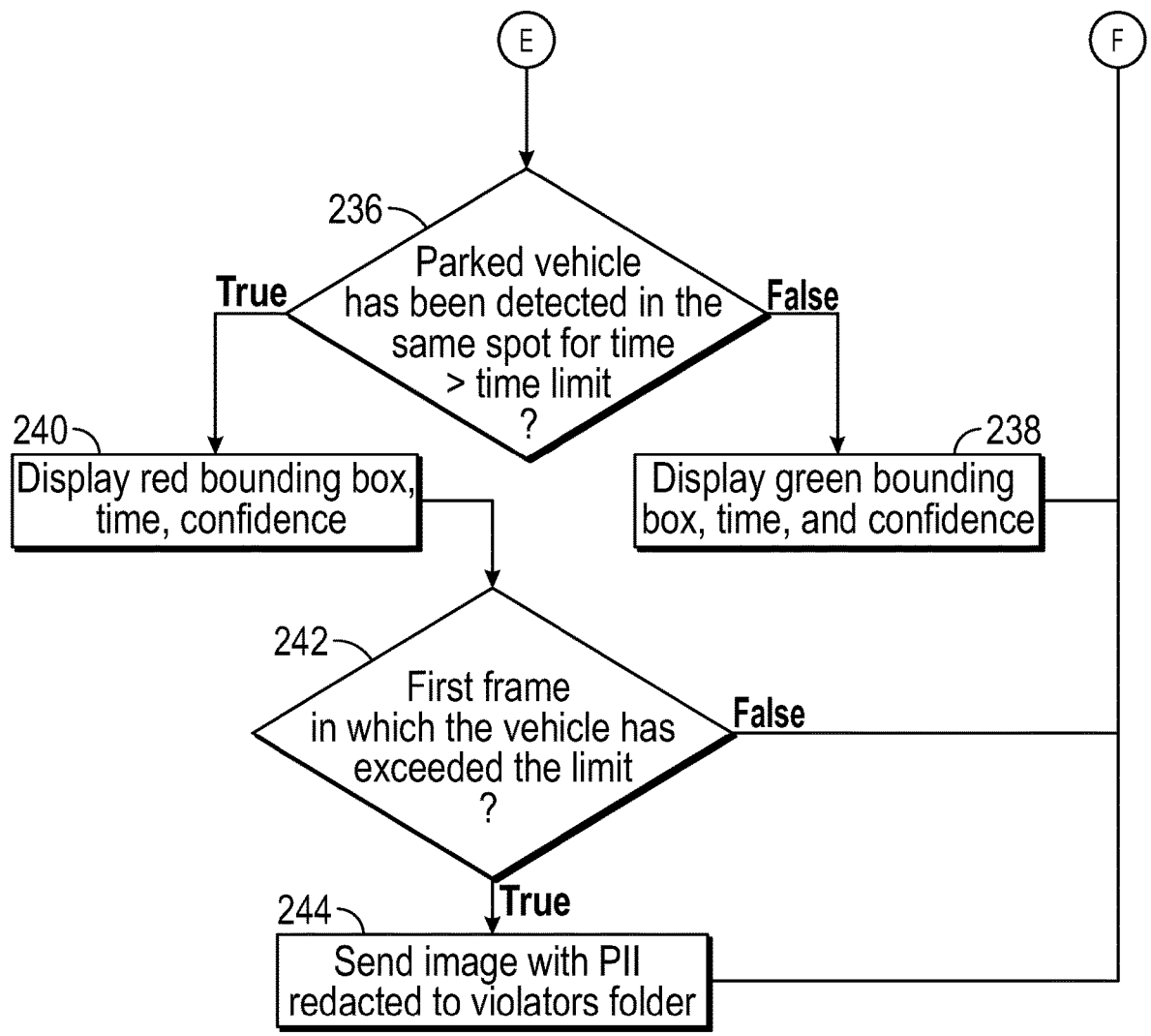

FIGS. 2A to 2C is a flowchart of an example method of the present disclosure. The method can initiate at step 202 with a current frame (e.g., image) being displayed. The user can select one or more areas where vehicles may be detected such as a parking spot, in step 204. Further, the user can specify a size and/or shape of the bounding area. The location of the bounding area relative to the overall image can be selected as well. If the user terminates the image capturing and analysis program, the image pipeline maintained by the image processing unit can be purged in step 206. When the image capturing and analysis program is active, the image capturing and analysis program can detect the presence of vehicle(s) in step 208. The image processing unit can determine if the vehicle was present in a previous frame in step 210. When the vehicle is present in two or more temporally adjacent frames/images, the image processing unit can infer that the vehicle is parked in the parking spot in step 212. When the vehicle is not present in one image but is present in a later temporally adjacent image, the image processing unit can infer that the vehicle is newly parked in the parking spot. The vehicle can be added to a list of parked vehicles in step 214. For example, if an image is taken at time t1=zero and no vehicle is present in the image, but another image taken at time t2=10 indicates that a vehicle is present the list of parked vehicles can be updated.

As illustrated in step 216, the analysis process of steps 202-214 can be executed in an iterative manner for a plurality of parked vehicles. In step 218, a bounding box/area analysis can be performed where the image processing unit can determine when the bounding box/area is greater than a multiplier of the average of the bounding box/area. For example, bounding box/area may be greater than four times the average of the bounding box/area. When the condition of step 218 is true, the vehicle may be deleted from a list of parked vehicles. When the condition of step 218 is false, the method can include determining if the current frame does or does not contain a vehicle in the same location as the parked vehicle at step 2

When this condition of step 222 is true, the method can include incrementing a count of undetected frames/images by the image processing unit in step 224. The method can include a step 226 of determining a number of consecutive frames/images where the vehicle is undetected. If this number is greater than a predetermined amount, the method can include a step 228 of removing the vehicle from the list of parked vehicles.

If the current frame does not contain a vehicle in the same location as the parked vehicle in step 222, the method can include a step 230 of determining when a boundary box overlaps with another boundary box by a predetermined amount, such as 75%. For example, the boundary box of two temporally adjacent images are 75% the same. Conversely, the vehicle can remain on the list when the similarity in boundary box measurements is greater than 75%. To be sure, these values are merely an example and are not meant to be limiting. If the number is not greater than a predetermined amount, the method can revert to step 216. When the condition in step 230 is true, the method can advance to a step 232 of deleting the vehicle from the list when it has a low confidence value computed as mentioned above.

In step 234, a determination can be made as to whether vehicles included on the list of parked vehicles have been evaluated. If true, the method can revert to step 206. Otherwise, in step 236, the image processing unit can determine when the parked vehicle has been detected in the same parking spot for a time that is greater than a predetermined time limit (e.g., parking limit). If the vehicle is not overparked, the method can include a step 238 of generating a graphical user interface (GUI) that includes an image of the bounding box. The GUI can comprise a highlighted box having a hue, such as green. Additionally, the GUI can display information such as the bounding box, along with a time (obtained from the time stamp), and a confidence level calculated for the bounding box. When the vehicle has been determined to be overparked, the method can include as step 240 of generating a graphical user interface (GUI) that includes an image of the bounding box. The GUI can comprise a highlighted box having a hue, such as red. Additionally, the GUI can display information such as the bounding box, along with a time (obtained from the time stamp), and a confidence level calculated for the bounding box. The image processing unit can identify a first frame/image in which the vehicle has exceeded the parking limit in step 242. The image can be transmitted to a service provider or other authority in step 244. This can include transmitting the image to a folder or drive where parking limit violators are stored. In some instances, the image of the vehicle can be transmitted with PII removed. This allows a parking limit enforcer to visually identify the vehicle of interest without viewing PII. In other instances, the location of the vehicle can be known from the parking spot.

Figure 3:
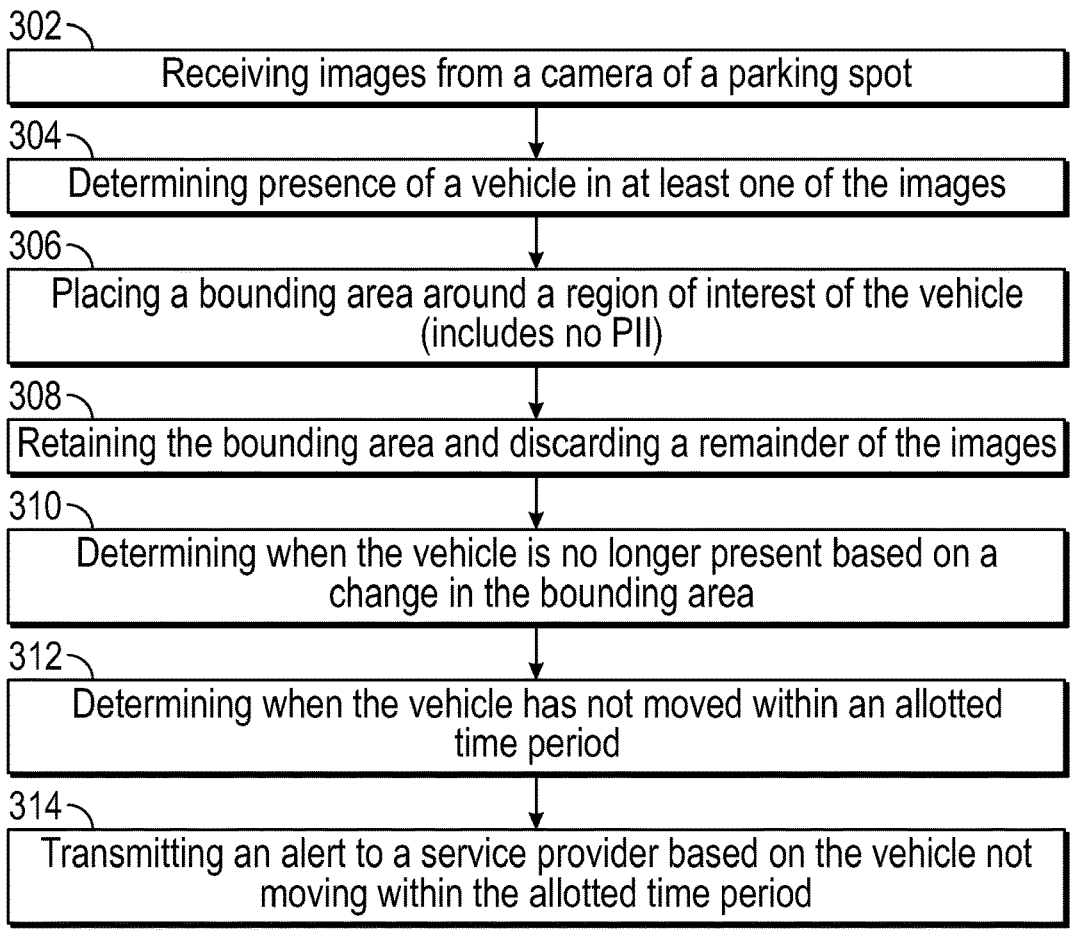
FIG. 3 is a flowchart of an example method of the present disclosure

FIG. 3 is a flowchart of another example method of the present disclosure. The method can include a step 302 of receiving images from a camera of a parking spot. Each of the images being time stamped in some instances. The method can include a step 304 of determining presence of a vehicle in at least one of the images. A time counter can be triggered when the presence of the vehicle is determined and occupancy of the parking spot is confirmed.

When occupancy of the parking spot has been determined, the method can include a step 306 of placing a bounding area around a region of interest of the vehicle. The region of interest includes no personally identifiable information in some instances. Additional images or frames can be processed and analyzed once the bounding area is determined. Using a relative position of the bounding area from the image, additional images can be processed so as to retain only the portion of the image found in the bounding area. Thus, the method can include a step 308 of retaining the bounding area and discarding a remainder of the images. That is, only the bounding area portion of the image is retained, while the remaining part of the image that does not include the bounding area portion can be discarded.

Once the bounding areas of the images are determined, the method can include a step 310 of determining when the vehicle is no longer present based on a change in the bounding area. As noted above, this can include comparing boundary areas of temporally adjacent images to one another and determining changes to the boundary areas. In some instances, when the comparison indicates that a change in the boundary areas exceeds a threshold, the vehicle can be considered no longer present. Motion in the bounding area between temporally adjacent images can also be determined using this comparative process.

The method can also include a step 312 of determining when the vehicle has not moved within an allotted time period. As noted above, this determination can be made when no change or no threshold exceeding change is determined in the boundary areas of temporally adjacent images. When this lack of change in boundary areas occurs for a time that exceeds a parking time limit, the vehicle can be identified as being overparked. To be sure, the counter mentioned above continues to track the parking time for the vehicle. When the vehicle remains in the parking spot for a time period that exceeds the parking time limit, the vehicle can be identified as being overparked. When a vehicle is overparked, the method can include a step 314 of transmitting an alert to a service provider based on the vehicle not moving within the allotted time period.

Figure 4:
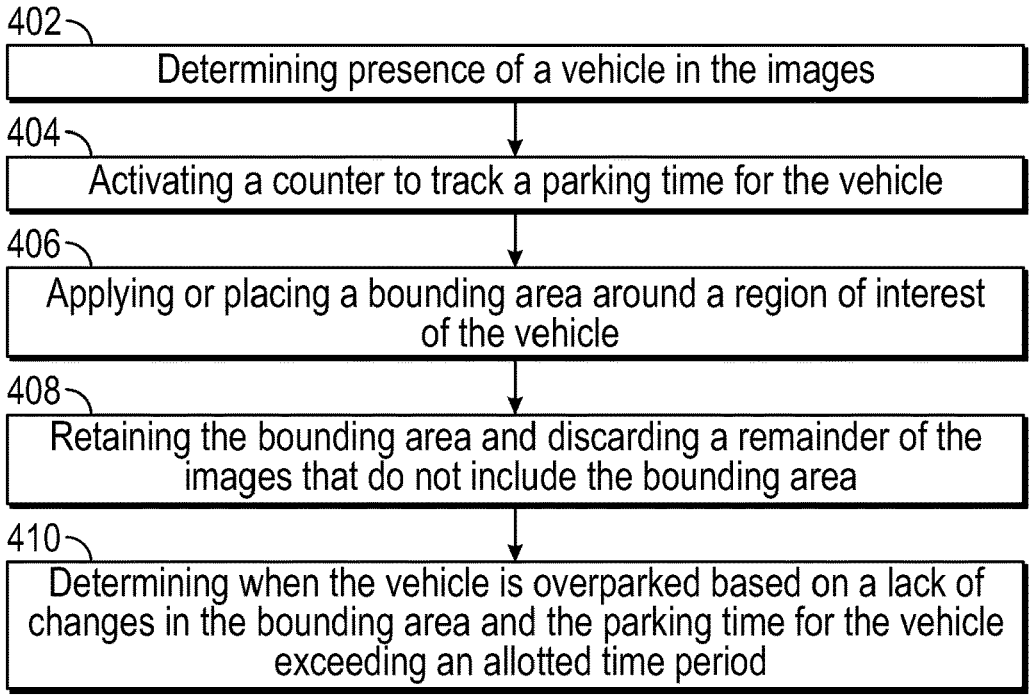
FIG. 4 is a flowchart of an example method of the present disclosure.

FIG. 4 is a flowchart of another example method of the present disclosure. The method can include a step 402 of determining presence of a vehicle in the images. For example, an image processing unit associated with the camera can be used to evaluate the images. The use of an edge device, such as an image processing unit co-located with the camera can ensure that connected systems are not receiving or processing PII. For example, in a traditional SaaS deployment, processing of images may occur in a cloud environment, which can potentially place the cloud environment into having to comply with various regulations related to mitigating disclosure of PII.

When the vehicle is determined in the image(s), such as via computer visions algorithms or the like trained on data sets to detect parked vehicles, the method can include a step 404 of activating a counter to track a parking time for the vehicle. The method can include a step 406 of applying or placing a bounding area around a region of interest of the vehicle. The region of interest includes no personally identifiable information such as a vehicle make, a vehicle model, a license plate, an image of the driver or passenger, or other similar PII.

The bounding area can be applied to each of the images. In some instances, the bounding area can be applied using relative coordinates of the established bounding area to obtain the bounding area from each of the images. The method can include a step 408 of retaining the bounding area and discarding a remainder of the images that do not include the bounding area. Using only the parts of the images found in the bounding area (or within an approximate distance from or around the bounding areas), the method can include a step 410 of determining when the vehicle is over parked based on a lack of changes in the bounding area and the parking time for the vehicle exceeding an allotted time period.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characterization have been described, embodiments of the disclosure may relate to numerous other device characterization. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   receiving a plurality of images of a parking spot from a camera, wherein each of the images is time stamped;
   determining a presence of a vehicle in one or more of the images;
   placing a bounding area around a region of interest of the vehicle, wherein the region of interest includes no personally identifiable information;
   retaining the bounding area and discarding a remainder of the images;
   determining, based on a change in the bounding area of the images, that the vehicle is no longer present;
   detecting, based on an output of an accelerometer associated with the camera, that a tampering event comprising an impact or a reorienting of the camera has occurred;
   applying a first error correction to compensate for a movement of the camera; and
   applying a second error correction to compensate for one or more ambient weather conditions.

2. The method according to claim 1, further comprising detecting a motion in the bounding area between temporally adjacent images.

3. The method according to claim 1, further comprising:
   determining that the vehicle has not moved within an allotted time period; and
   transmitting, based on the vehicle not moving within the allotted time period, an alert to a service provider.

4. A system, comprising:
   an imaging device configured to obtain a plurality of images of a parking spot, wherein each of the images is time stamped; and
   an image processing unit comprising a processor and a memory for storing instructions, wherein the processor is configured to execute the instructions to:
   determine a presence of a vehicle in one or more of the images;
   activate a counter to track a parking time for the vehicle;
   place a bounding area around a region of interest of the vehicle, wherein the region of interest includes no personally identifiable information;
   retain the bounding area and discard a remainder of the images that do not include the bounding area, wherein one or more relative coordinates of the bounding area are used to obtain the bounding area from each of the images;
   determine when the vehicle is over parked based on a lack of changes in the bounding area and the parking time for the vehicle exceeding an allotted time period;
   detect, based on an output of an accelerometer associated with the imaging device, that a tampering event comprising an impact or a reorientation of the imaging device has occurred;
   apply a first error correction to compensate for a movement of the imaging device; and
   apply a second error correction to compensate for one or more ambient weather conditions.

5. The system according to claim 4, wherein the processor is further configured to execute the instructions to detect a motion in the bounding area between temporally adjacent images to determine when the vehicle is moving.

6. The system according to claim 5, wherein the processor is further configured to execute the instructions to determine a confidence level of a state change between a plurality of the images that is indicative of the vehicle moving.

7. The system according to claim 4, wherein the processor is further configured to execute the instructions to:
   determine when the vehicle has not moved within the allotted time period; and
   transmit an alert to a service provider based on the vehicle not moving within the allotted time period along with one or more relative coordinates of the parking spot.

8. The system according to claim 4, wherein the processor is further configured to execute the instructions to receive an indication of the parking spot from a user.

9. A device, comprising:
   a processor and a memory for storing instructions, the processor configured to execute the instructions to:
   receive a plurality of images from a camera of a parking spot, wherein each of the images is time stamped;
   determine a presence of a vehicle in one or more of the images;
   place a bounding area around a region of interest of the vehicle, wherein the region of interest includes no personally identifiable information;
   retain the bounding area and discard a remainder of the images;
   determine that the vehicle is no longer present based on a change in the bounding area of the images;
   detect, based on an output of an accelerometer associated with the camera, that a tampering event comprising an impact or a reorienting of the camera has occurred;
   apply a first error correction to compensate for a movement of the camera; and
   apply a second error correction to compensate for one or more ambient weather conditions.

10. The device according to claim 9, wherein the processor is further configured to execute the instructions to detect a motion in the bounding area between temporally adjacent images.

11. The device according to claim 9, wherein the processor is further configured to execute the instructions to:
  determine when the vehicle has not moved within an allotted time period; and
  transmit an alert to a service provider based on the vehicle not moving within the allotted time period.

\* \* \* \* \*